(No Model.) 2 Sheets—Sheet 2.
L. COOPER.
COTTON HARVESTER.
No. 504,019. Patented Aug. 29, 1893.
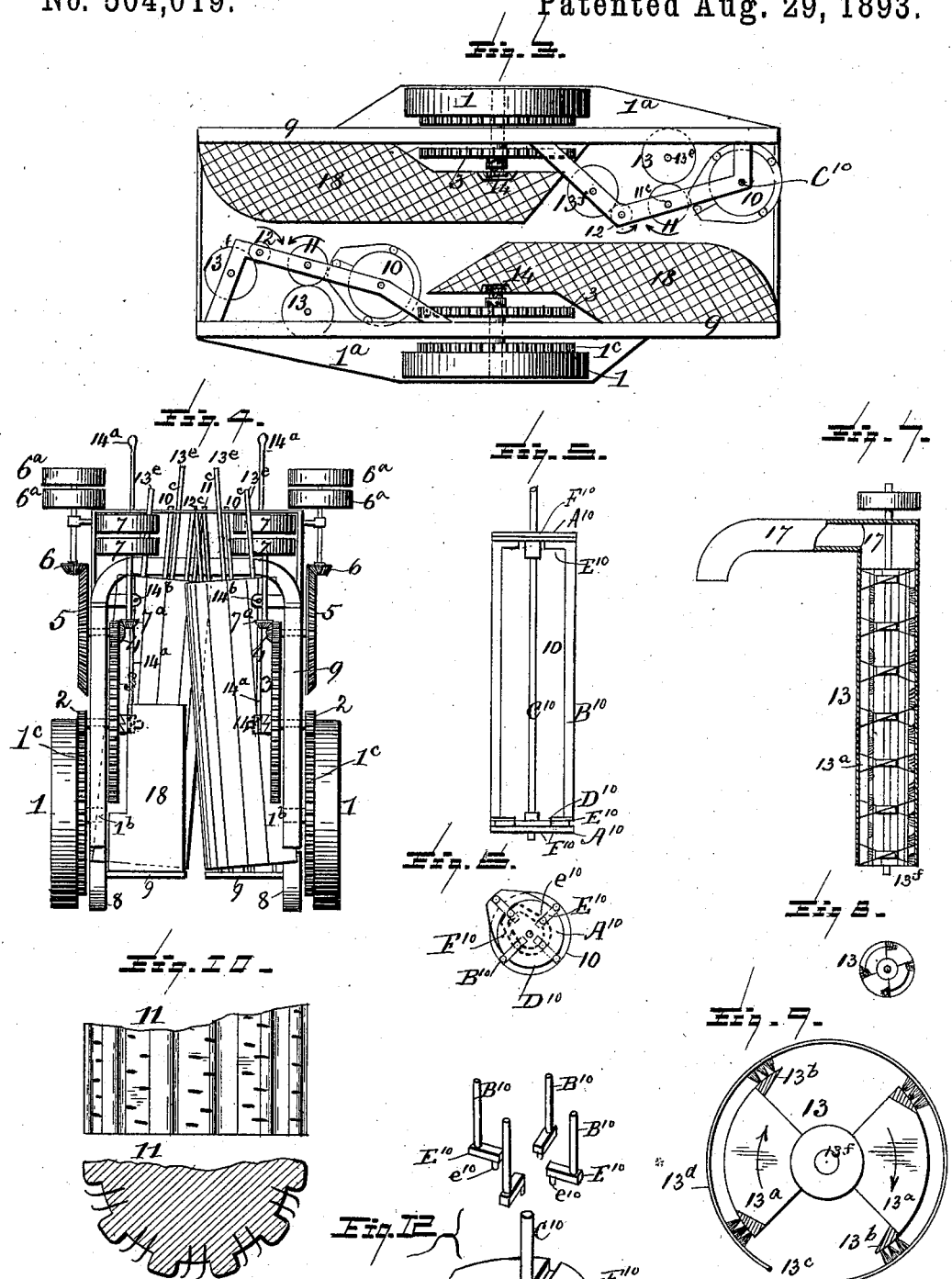
Witnesses
C. C. Schuller
J. J. Masson
By his Attorney 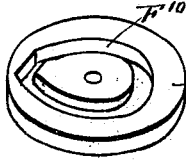
Inventor
Louis Cooper
E. E. Masson

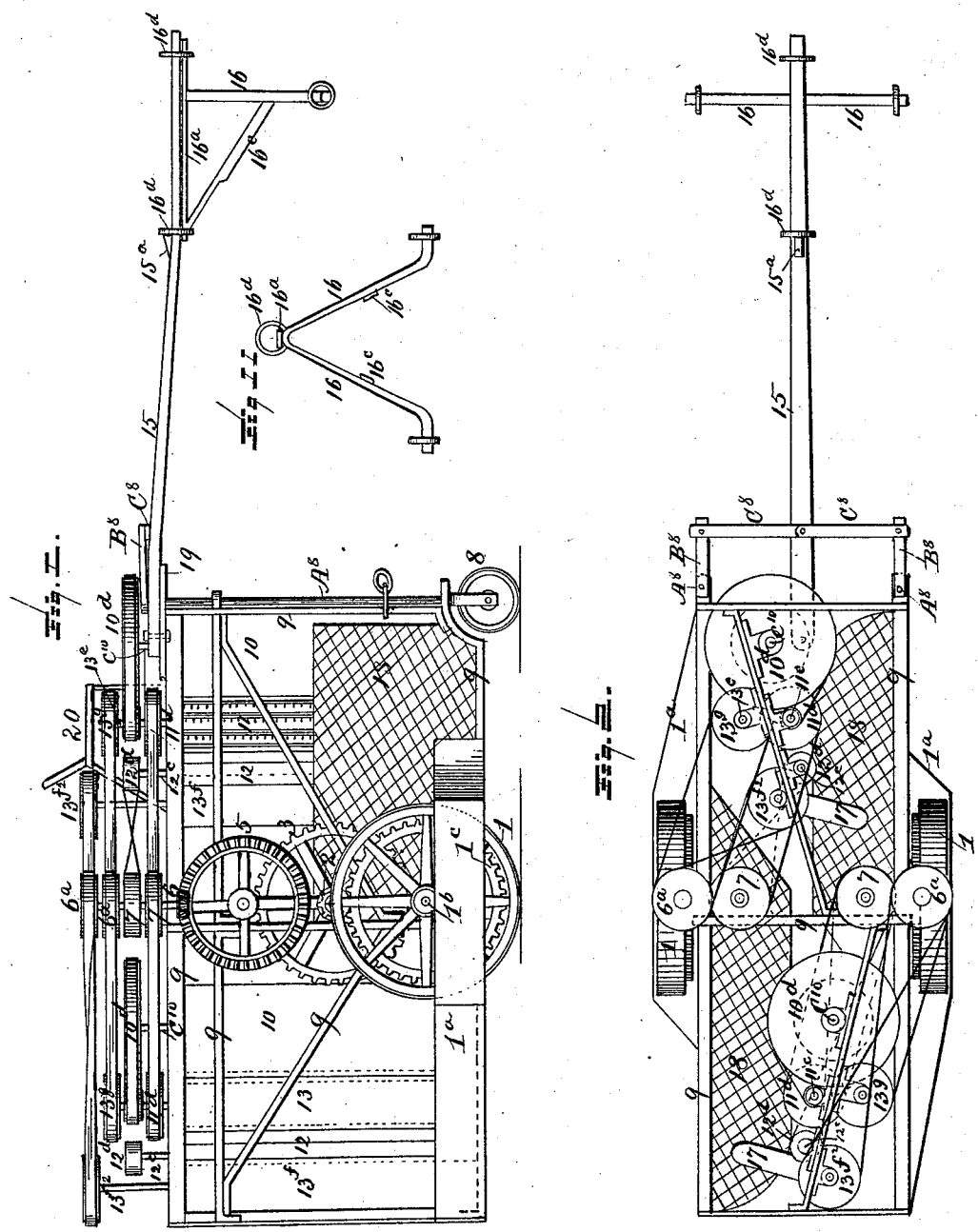

UNITED STATES PATENT OFFICE.

LOUIS COOPER, OF BOLLING, ALABAMA, ASSIGNOR OF ONE-HALF TO JAMES A. REID, OF SAME PLACE.

COTTON-HARVESTER.

SPECIFICATION forming part of Letters Patent No. 504,019, dated August 29, 1893.

Application filed December 21, 1891. Serial No. 415,767. (No model.)

*To all whom it may concern:*

Be it known that I, LOUIS COOPER, a citizen of the United States, residing at Bolling, in the county of Butler, State of Alabama, have invented certain new and useful Improvements in Cotton-Harvesters, of which the following is a specification, reference being had therein to the accompanying drawings.

My invention relates to machinery for picking cotton; said invention will first be described in connection with the drawings, and then pointed out in the claims.

Figure 1 is a side view of a cotton harvester constructed in accordance with my invention. Fig. 2 is a top view of the same. Fig. 3 is a bottom view of the same showing the bottoms of the various operating cylinders but not their inclined positions. Fig. 4 is a rear view of the machine. Fig. 5 is a front view of one of the cotton-plant benders. Fig. 6 is a top view of the same showing the grooved cam to guide the ends of the roller-supporting arms thereof. Fig. 7 is a side view with the casing in section of one of the combined brushes and fans to operate upon the picker-cylinders. Fig. 8 is a horizontal section of the same. Fig. 9 is a horizontal section of the same on a larger scale. Fig. 10 represents in side view and horizontal section a portion of one of the picking cylinders. Fig. 11 is a front view of the tongue-yoke. Fig. 12 represents in perspective the lower ends of the folders, and the grooved plates used to guide them.

In said drawings the numeral 1 is placed upon the main driving wheels which are partly incased in a sheet iron shield $1^a$ on the outside of the frame to prevent the limbs of cotton plants of outer rows from becoming entangled in the wheels. Said wheels support short axles $1^b$ received in boxes attached to the frame 9 of the machine, and gear wheels $1^c$ are attached to or cast on the inner side of each driving wheel. A pinion 2 is made to mesh with each gear wheel $1^c$ and upon its shaft is mounted a gear wheel 3. A combined straight and beveled pinion 4 is made to mesh with the wheel 3, and upon the horizontal shaft of the pinion 4 is mounted a beveled cog wheel 5 which receives its motion from said shaft. A beveled pinion 6 meshes with the wheel 5 and the vertical shaft of said pinion carries two belt-pulleys $6^a$, one of which gives motion to a combined brush-fan 13 by means of a pulley $13^g$ on the shaft $13^e$ of said brush-fan and a straight belt, and the other gives motion to a similar combined brush-fan $13^f$ by means of a pulley $13^{f2}$ and a crossed belt, so that they will rotate in opposite directions for purposes which will be hereinafter described. The beveled portion of the pinion 4 meshes with a beveled pinion $7^a$ upon a vertical shaft that carries two pulleys 7 by which motion is given to the picker cylinder 11 on the shaft $11^c$ by means of a pulley $11^d$ and a straight belt, and to the picker cylinder 12 on the shaft $12^c$ by means of a pulley $12^d$ and a crossed belt, so that they will be rotated in opposite directions to pick the cotton from the front and rear sides of the limbs of the cotton plants.

The front part of the machine is supported by guide wheels 8, their short axles being received in the forked lower ends of vertical bars $A^8$ which pass loosely at the top and bottom through the forward end of the frame of the machine. To the upper end of each bar $A^8$ is secured a flat metal strap $B^8$ located horizontally above the frame of the machine, and the forward ends of the straps $B^8$ are pivotally connected to flat horizontal bars $C^8$, as shown in Fig. 2, which are pivotally connected together and to the tongue 15 on top of the latter, so as to allow the bars $C^8$ and the wheels 8 to assume any desired angle in turning the machine.

The frame 9 is supported by the wheels 1 and 8 and is supporting all the mechanism. It is formed of metal parts clearly shown in Figs. 1, 2, 3, and 4, of suitable shape, and provided at proper points with bearing boxes to receive the rotatable parts of the mechanism. Said mechanism is divided into two substantially similar sections, one on the front and one on the back of the machine, but on opposite sides of its axial line, and the cotton plant guiding cylinders, the picker-cylinders and the brush-cylinders of each section are inclined toward a vertical central plane that may be made to pass fore and aft through the center of the machine, the bottoms of said cylinders being some distance away from the central plane, while their upper ends overlie said central plane, the opening between them corresponding to the conical shape of cotton plants in the field rows, the limbs of which are first suitably bent by the folders 10 mounted on shaft $C^{10}$ carrying pulley $10^d$ and located at the front end of each section of the mechanism in front of the picker cylinders 11. The folders are rotated to bring the front sides of the limbs of the cotton plants in contact with the picker cylinders 11, and from said cylinders the rear sides of the limbs come in contact with the adjacent picker-cylinder 12 as will be hereinafter described.

The folders 10 consist of four radial arms $E^{10}$, both at the top and bottom of the folder; said arms are connected by rollers $B^{10}$ extending from the outer ends of the bottom arms to the top arms, and to cause them to be projected outwardly beyond a circular path when they reach a position nearest to the picker cylinders 11, the inner portion of each arm is provided with a vertical pin or short roller $e^{10}$ that is received and adapted to travel in an eccentric groove $F^{10}$ formed in stationary plate $A^{10}$ secured to the frame of the machine. The shaft of the folder is shown at $C^{10}$, and upon the top and bottom portions of said shaft are mounted and rigidly attached the disks or plates $D^{10}$, each provided with four radial grooves equi-distant from each other to receive the four radial arms $E^{10}$, the latter being either flat or square bars of sufficient length to reach from points adjacent to the shaft $C^{10}$ to the periphery of the eccentrically grooved stationary plate $A^{10}$, the groove $F^{10}$ in said plate being of such form as to push outwardly the arms $E^{10}$ and their rollers $B^{10}$ to bring the limbs of the cotton plants close to the picker cylinders, but to recede after having brought them to said cylinders.

The picker cylinders 11 are mounted on shafts $11^c$, carrying pulleys $11^d$ and are longitudinally fluted or grooved and composed of one or more sections, and within the grooves is attached card cloth or bent pins are driven partially therein to engage with the cotton of the plants, and the ribs between said grooves serve as fenders to protect the card-cloth from the limbs, bolls, &c., or other than the cotton lint. The picker cylinder 11 rotates in the same direction as the folder 10 and operates upon the limbs of the cotton plants until they reach the picker cylinder 12 which is mounted upon a shaft $12^c$ carrying a pulley $12^d$ and rotates in the opposite direction from the cylinder 11, and they are thus carried between the two cylinders, and the two operate upon both sides of the limbs. The cylinder 12 is constructed similarly as the cylinder 11 but is of smaller diameter and is rotated at a higher speed. There is one set of these cylinders on each side of the axial line of the machine, but as one set of cylinders is placed farther forward than the other, one side of the plant is picked and disengaged before the cylinders on the opposite side engage it. This is to give the plant a twisting motion when in contact with the folder arms and to cause the central limbs to be forced out toward the picker-cylinders and as said cylinders are inclined toward the center of the row at the top and at that point pass beyond the center of the row so that the cylinders may come in contact with the shortest as well as the longest limbs.

To remove the cotton from the card-cloth of the cylinders 11 and 12, a combined brush and fan cylinder is placed alongside of each picker cylinder, and over its upper end is placed a sheet metal hood 17 provided on one side with a pipe to lead the cotton lint into storage boxes 18 which have their tops made of wire cloth or perforated metal to permit the escape therefrom of the air brought from the fans, with the cotton.

The combined brush and fan consists of a shaft $13^f$ on which collars are attached at suitable distances from each other, and to said collars are secured sheet metal wings $13^a$, one on each side of the shaft. These wings are twisted, as the blades of a propeller, to form spirals and create an upward current of air, and between each of said wings, a space the size of the wings is left open for the current to pass through. The corners of the wings are turned up on one side and down on the other, and to them are attached triangular wooden slats $13^b$ extending the entire length of the series of fans. In said slats are inserted the tufts of bristles which form the brushes used to remove the cotton from the picker cylinders. The inner faces of the slats are set at such an angle that the slats in revolving create an inwardly directed current which enters through the vertical slot or opening $13^c$ in the casing $13^d$ of the fans, said opening being in the side next to the picker cylinders to permit the brushes and fans to take the cotton from said cylinder and deliver it to the storage boxes 18.

To throw the operating mechanism in and out of gear, clutches 14 are placed upon the shafts of the pinions 2. They are adapted to be operated by levers $14^a$ pivoted to the frame at $14^b$ and extending to the top of the machine and within reach of the driver in his seat 20. The tongue 15 is attached by a bolt to a plank 19 which is extended lengthwise of the machine on top of the upper section of the top of the frame. It is bolted to this plank far enough back from the end of said plank to be supported thereby in a horizontal position. It is also connected loosely by a bolt with the flat bars $C^8$ as heretofore described, and has on top, at a proper distance from the end a stop $15^a$ for holding back the neck-yoke 16 which is constructed of such shape as to pass over the top of the rows of cotton plants, being curved upward toward the center and the ends being low enough to attach the horses thereto. The yoke has on top thereof a flat bar of iron $16^a$ which is rigidly attached to the curved central portion of said yoke and has braces 16ᶜ extending from the rear end of this flat bar to the two branches of the yoke. Attached to the front and rear portions of the flat bar are two rings 16ᵈ which are passed over the end of the tongue, the rear ring resting against the stop 15ᵃ on top of the tongue.

Having now fully described my invention, I claim—

1. In a cotton harvester the combination of the frame, a pair of supporting wheels, and two caster-wheels pivoted at the front end, with two series of picker-cylinders located at diagonally opposite corners of the machine, one series being at the front end of the machine and the second series at the back end, said cylinders being nearly vertical but slightly inclined, substantially as described.

2. In combination with the picker-cylinders of a cotton harvester, the combined brush and fan alongside thereof, consisting of a central shaft, a series of collars having inclined wings thereon and brushes attached to said wings and a vertically slotted casing inclosing said brushes and wings, substantially as described.

3. The combination of the tongue of a cotton harvester having its inner end pivoted thereto, the bars C⁸, and levers B⁸ connecting the tongue with the upright pivot bars of the caster wheels at one end, and at the opposite end the bent yoke 16 having its top bar connected to the tongue at two points by rings, substantially as described.

4. In a cotton harvester the combination of a pair of picker cylinders at one end of the machine with a similar pair at the opposite end, the cylinders of each pair being of different sizes and rotated at different speed and in opposite directions, substantially as described.

5. In a cotton harvester the combination of two pairs of picker cylinders, one pair being on one side of the longitudinal axis of the machine and adjacent to the front thereof, and one pair being on the opposite side of said axis and adjacent to the rear thereof, with the plant-folders 10 in front of each pair, substantially as described.

In testimony whereof I affix my signature in presence of two witnesses.

LOUIS COOPER.

Witnesses:
J. A. REID,
HICKS BLACK.